US012742374B2

(12) United States Patent
Li et al.

(10) Patent No.: US 12,742,374 B2
(45) Date of Patent: Sep. 22, 2026

(54) MACHINE LEARNING APPROACH FOR GENERATING SUBSURFACE REPRESENTATIONS IN LAYER-SPACE

(71) Applicant: Chevron U.S.A. Inc., San Ramon, CA (US)

(72) Inventors: Lewis Li, Houston, TX (US); Tao Sun, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1054 days.

(21) Appl. No.: 17/732,974

(22) Filed: Apr. 29, 2022

(65) Prior Publication Data

US 2023/0349277 A1 Nov. 2, 2023

(51) Int. Cl.
*E21B 43/16* (2006.01)
*G06N 3/045* (2023.01)

(52) U.S. Cl.
CPC ............ *E21B 43/16* (2013.01); *G06N 3/045* (2023.01); *E21B 2200/22* (2020.05)

(58) Field of Classification Search
CPC ..... E21B 43/16; E21B 2200/22; G06N 3/045; G06N 3/0455; G06N 3/0464; G06N 3/094; G06N 3/0475; G06N 3/0495; G06N 3/0499; G06N 3/0895; G06N 3/09; G06N 3/091; G06N 3/092; G06N 3/096; G06N 3/098; G06N 3/0985; G01V 20/00; G01V 1/28
See application file for complete search history.

(56) References Cited

U.S. PATENT DOCUMENTS

| | | | |
|---|---|---|---|
| 2,653,220 | A | 9/1953 | Bays |
| 7,079,953 | B2 | 7/2006 | Thorne |
| 7,516,055 | B2 | 4/2009 | Strebelle |
| 7,630,517 | B2 | 12/2009 | Mirowski |
| 7,706,981 | B2 | 4/2010 | Wilkinson |
| 8,271,244 | B2 | 9/2012 | Ross |
| 8,666,149 | B2 | 3/2014 | Thorne |

(Continued)

FOREIGN PATENT DOCUMENTS

| | | |
|---|---|---|
| CN | 102540256 | 7/2012 |
| CN | 103454678 | 12/2013 |

(Continued)

OTHER PUBLICATIONS

Ducros, M., et al. “Expert systems and machine learning techniques for effective petroleum system risk assessment and model update”. (ResearchGate, 2018) Rio Oil & Gas Conference, Rio de Janeiro, Sep. 2018. accessed online: <ttps:// www.researchgate.net/publication/326609988> (Year: 2018).

(Continued)

*Primary Examiner* — Rehana Perveen
*Assistant Examiner* — Troy A Maust
(74) *Attorney, Agent, or Firm* — Sheppard, Mullin, Richter & Hampton LLP

(57) ABSTRACT

Subsurface representations that define subsurface configurations in layer space are used to train a machine learning model. The trained machine learning model is used to generate synthetic subsurface representations in the layer space. The synthetic subsurface representations are generated to match one or more conditioning characteristics. Conditioning of the trained machine learning model is performed in latent space.

20 Claims, 9 Drawing Sheets

(56) References Cited

U.S. PATENT DOCUMENTS

| | | | |
|---|---|---|---|
| 8,954,303 | B2 | 2/2015 | Pyrcz |
| 9,187,984 | B2 | 11/2015 | Usadi |
| 9,753,180 | B2 | 9/2017 | Suzuki |
| 9,804,282 | B2 | 10/2017 | Xu |
| 10,036,829 | B2 | 7/2018 | Ghayour |
| 10,190,403 | B2 | 1/2019 | Samuel |
| 10,287,858 | B2 | 5/2019 | Ghayour |
| 10,317,569 | B2 | 6/2019 | Sun |
| 10,319,143 | B2 | 6/2019 | Branets |
| 10,365,261 | B2 | 7/2019 | Montgomery |
| 10,816,440 | B2 | 10/2020 | Amendt |
| 10,984,590 | B1 | 4/2021 | Li |
| 11,010,969 | B1 | 5/2021 | Li |
| 11,187,826 | B2 | 11/2021 | Laugier |
| 11,249,220 | B2 | 2/2022 | Sun |
| 11,263,362 | B2 | 3/2022 | Sun |
| 11,320,566 | B2 | 5/2022 | Hern |
| 2002/0013687 | A1 | 1/2002 | Ortoleva |
| 2002/0120429 | A1 | 8/2002 | Ortoleva |
| 2005/0180261 | A1 | 8/2005 | Mandal |
| 2006/0041409 | A1 | 2/2006 | Strebelle |
| 2006/0052938 | A1 | 3/2006 | Thorne |
| 2006/0136162 | A1 | 6/2006 | Hamman |
| 2007/0100593 | A1 | 5/2007 | Deffenbaugh |
| 2007/0219724 | A1 | 9/2007 | Li |
| 2008/0015784 | A1 | 1/2008 | Dorn |
| 2009/0262603 | A1 | 10/2009 | Hurley |
| 2009/0306945 | A1 | 12/2009 | Wu |
| 2009/0319243 | A1 | 12/2009 | Suarez-Rivera |
| 2010/0004864 | A1 | 1/2010 | Thorne |
| 2010/0149917 | A1 | 6/2010 | Imhof |
| 2010/0332205 | A1 | 12/2010 | Tillier |
| 2011/0002194 | A1 | 1/2011 | Imhof |
| 2011/0054857 | A1 | 3/2011 | Moguchaya |
| 2011/0054869 | A1 | 3/2011 | Li |
| 2011/0213600 | A1 | 9/2011 | Strebelle |
| 2011/0231164 | A1 | 9/2011 | Zhang |
| 2011/0240310 | A1 | 10/2011 | Sun |
| 2011/0264430 | A1 | 10/2011 | Tapscott |
| 2011/0272161 | A1 | 11/2011 | Kumaran |
| 2012/0029828 | A1 | 2/2012 | Pepper |
| 2012/0215628 | A1 | 8/2012 | Williams |
| 2012/0221302 | A1 | 8/2012 | Lewandowski |
| 2012/0221306 | A1 | 8/2012 | Hurley |
| 2012/0277996 | A1 | 11/2012 | Hurley |
| 2013/0046524 | A1 | 2/2013 | Gathogo |
| 2013/0064040 | A1 | 3/2013 | Imhof |
| 2013/0118736 | A1 | 5/2013 | Usadi |
| 2013/0151161 | A1 | 6/2013 | Imhof |
| 2013/0179080 | A1 | 7/2013 | Skalinski |
| 2013/0246031 | A1 | 9/2013 | Wu |
| 2013/0294197 | A1 | 11/2013 | Vallikkat Thachaparambil |
| 2013/0318141 | A1 | 11/2013 | Maucec |
| 2013/0329986 | A1 | 12/2013 | Strebelle |
| 2013/0338927 | A1 | 12/2013 | Kumaran |
| 2014/0035912 | A1 | 2/2014 | Julian |
| 2014/0316706 | A1 | 10/2014 | Grant |
| 2014/0358440 | A1 | 12/2014 | Pyrcz |
| 2015/0066460 | A1 | 3/2015 | Klinger |
| 2015/0088424 | A1 | 3/2015 | Burlakov |
| 2015/0112656 | A1 | 4/2015 | Rodriguez-Herrera |
| 2015/0205001 | A1 | 7/2015 | Carruthers |
| 2015/0212231 | A1 | 7/2015 | Borouchaki |
| 2015/0219793 | A1 | 8/2015 | Li |
| 2015/0241591 | A1 | 8/2015 | Burmester |
| 2015/0309197 | A1 | 10/2015 | Dimitrov |
| 2016/0041279 | A1 | 2/2016 | Casey |
| 2016/0048933 | A1 | 2/2016 | Strebelle |
| 2016/0103245 | A1 | 4/2016 | Pyrcz |
| 2016/0139299 | A1 | 5/2016 | Leger |
| 2016/0313463 | A1 | 10/2016 | Wahrmund |
| 2016/0342718 | A1 | 11/2016 | Moyner |
| 2017/0011149 | A1 | 1/2017 | Liu |
| 2017/0153343 | A1 | 6/2017 | Almarhoon |
| 2017/0205531 | A1 | 7/2017 | Berard |
| 2017/0227451 | A1 | 8/2017 | Hoegerl |
| 2018/0003839 | A1 | 1/2018 | Lowell |
| 2018/0217283 | A1 | 8/2018 | Klinger |
| 2018/0225778 | A1 | 8/2018 | Grant |
| 2018/0334902 | A1 | 11/2018 | Olsen |
| 2019/0026405 | A1 | 1/2019 | Ramsay |
| 2019/0094414 | A1 | 3/2019 | Prochnow |
| 2019/0243028 | A1 | 8/2019 | Von Gonten |
| 2020/0183041 | A1 | 6/2020 | Denli |
| 2020/0183046 | A1* | 6/2020 | Wheelock .............. G01V 1/282 |
| 2020/0183047 | A1* | 6/2020 | Denli ..................... G06N 3/094 |
| 2020/0308934 | A1 | 10/2020 | Li |
| 2020/0380390 | A1 | 12/2020 | Sun |
| 2021/0048556 | A1 | 2/2021 | Sun |
| 2021/0173117 | A1 | 6/2021 | Laugier |
| 2021/0174583 | A1 | 6/2021 | Li et al. |
| 2021/0222523 | A1 | 7/2021 | Sun |
| 2021/0223431 | A1 | 7/2021 | Hern |
| 2021/0302620 | A1 | 9/2021 | Hern |
| 2021/0341642 | A1 | 11/2021 | Harris |
| 2022/0035068 | A1 | 2/2022 | Cheng |

FOREIGN PATENT DOCUMENTS

| | | | |
|---|---|---|---|
| CN | 103454686 | | 12/2013 |
| CN | 104111473 | | 10/2014 |
| CN | 105372705 | | 3/2016 |
| CN | 105717542 | | 6/2016 |
| CN | 105954802 | | 9/2016 |
| CN | 107942382 | | 4/2018 |
| CN | 107976713 | | 5/2018 |
| EP | 2917770 | | 9/2015 |
| FR | 3039679 | | 2/2017 |
| GB | 2474740 | | 4/2011 |
| WO | 2011139416 | | 11/2011 |
| WO | 2014123509 | | 8/2014 |
| WO | 2015042103 | | 3/2015 |
| WO | 2017019718 | | 2/2017 |
| WO | 2018017108 | A1 | 1/2018 |
| WO | 2018026995 | | 2/2018 |
| WO | 2018208634 | | 11/2018 |
| WO | 2019055562 | A1 | 3/2019 |
| WO | 2021030101 | | 2/2021 |

OTHER PUBLICATIONS

Edwards, Jonathan, Florent Lallier, Guillaume Caumon, and Cédric Carpentier. Uncertainty management in stratigraphic well correlation and stratigraphic architectures: A training-based method. (Science Direct, 2018) Computers & Geosciences 111. pp: 1-17. https://doi.org/10.1016/j.cageo.2017.10.008 (Year: 2018).

Véronique Gervais, et al. "Probability maps of reservoir presence and sensitivity analysis in stratigraphic forward modeling". (HAL, 2018) AAPG Bulletin, American Association of Petroleum Geologists, 2018, 102 (04), pp. 613-628. 10.1306/0913171611517242. hal-01883765 (Year: 2018).

Amaru, Maisha, Tao Sun, Lisa Goggin, and Ashley Harris. "Integration of computational stratigraphy models and seismic data for subsurface characterization." The Leading Edge 36, No. 11 (2017): 947a1-947a6 (Year: 2017).

Ana-Maria Ilisei et al., Automatic Classification of Subsurface Features in Radar Sounder Data Acquired in Icy Areas, 2013, IEEE, pp. 3530-3533 (Year: 2013).

Bertoncello, Antoine, Caers, Jef, Biver, Pierre, CaumonGuillaume, (2008). Geostatistics on Stratigraphic Grid. ERE department / Stanford University (pp. 1-16).

Chandra, Viswasanthi, Patrick William Michael Corbett, Sebastian Geiger, and Hamidreza Hamdi. Improving reservoir characterization and simulation with near-wellbore modeling. SPE Reservoir Evaluation & Engineering 16, No. 02 (2013): 183-193 (Year: 2013).

Dalman, Rory AF, and Gert Jan Weltje. SimClast: An aggregated forward stratigraphic model of continental shelves. Computers & geosciences 38, No. 1 (2012): 115-126 (Year: 2012).

Efros, A. A., & Freeman, W. T. (2001). Image quilting for texture synthesis and transfer. Proceedings of the 28th Annual Conference

(56) References Cited

OTHER PUBLICATIONS on Computer Graphics and Interactive Techniques—SIGGRAPH '01, 341-346. https://doi.org/10.1145/383259.383296.
Hantschel, Thomas, and Armin I. Kauerauf. Fundamentals of basin and petroleum systems modeling. Section 8.9. Springer Science & Business Media, 2009, pp. 399-404 (Year: 2009).
Harris S, Santoshini S, Kashem S, Viard T, Levannier A, Benabbou A. Complex geological modeling and quality assurance using unstructured grids. InAbu Dhabi International Petroleum Exhibition & Conference Nov. 12, 2018. Society of Petroleum Engineers. 20 pages.
Hawie, N., M. Callies, and E. Marfisi. "Integrated Multi-Disciplinary Forward Stratigraphic Modelling Workflow In Petroleum Systems Assessment." In SPE Middle East Oil & Gas Show and Conference OnePetro, 2017. 8 pages (Year: 2017).
Hawie, Nicolas, Jacob Covault, Dallas Dunlap, and Zoltan Sylvester 2017. "Slope-fan Depositional Architecture from High-resolution Forward Stratigraphic Models". EarthArXiv. Dec. 19. eartharxiv.org/f9dkp. (36 pages).
Hoffimann, J., Scheidt, C., Barfod, A., & Caers, J. (2017). Stochastic simulation by image quilting of process-based geological models. Computers and Geosciences, 106(February), 18-32. https://doi.org/10.1016/j.cageo.2017.05.012.
Liu et al. "Visual Analytics of Stratigraphic Correlation for Multi-attribute Well-logging Data Exploration." Jul. 2019 IEEE Access pp. (99): 1-1, Jul. 16, 2019, [online] [retrieved on Oct. 5, 2020 (Oct. 5, 2020)) Retrieved from the Internet< URL: https://ieeexplore.ieee.org/document/8764395>. entire document (13 pages).
Mahmud, K., Mariethoz, G., Caers, J., Tahmasebi, P., & Baker, A. (2014). Simulation of Earth textures by conditional image quilting. Water Resources Research, 50(4), 3088-3107. https://doi.org/10.1002/2013WR015069.
Mariethoz, G., Renard, P., & Straubhaar, J. (2010). The direct sampling method to perform multiple-point geostatistical simulations. Water Resources Research, 46(11). https://doi.org/10.1029/2008WR007621 (14 pages).
Michelena, Reinaldo J. et al., "Similarity Analysis: A New Tool to Summarize Seismic Attributes Information", Apr. 1998, TheLeading Edge. (Year: 1998).
One Petro Search Results, Jun. 15, 2021, 8 pp. (Year: 2021).
PCT International Search Report and Written Opinion for Application No. PCT/US21/23008, mailed Jun. 8, 2021 (8 pages).
PCT International Search Report and Written Opinion, International Application No. PCT/US20/31869, mailed Aug. 4, 2020. 2 pages.
PCT International Search Report and Written Opinion, International Application No. PCT/US20/44874, mailed Dec. 17, 2020. (8 pages).
PCT International Search Report and Written Opinion, International Application No. PCT/US20/61212, mailed Dec. 21, 2020. (7 pages).
PCT International Search Report and Written Opinion, International Application No. PCT/US2020/61323, mailed Feb. 19, 2021 (8 pages).
PCT International Search Report and Written Opinion, International Application No. PCT/US2020/61489, mailed Jan. 28, 2021 (7 pages).
PCT International Search Report and Written Opinion, International Application No. PCT/US21/12733, mailed Mar. 23, 2021 (11 pages).
PCT International Search Report and Written Opnion for Application No. PCT/US21/29956, mailed Aug. 2, 2021 (7 pages).
Rubio, R.H., Koppe, V.C., Costa, J.F.C.L. and Cherchenevski, P.K., 2015. How the use of stratigraphic coordinates improves grade estimation. Rem: Revista Escola de Minas, 68(4), pp. 471-477.
Sacchi, Quinto, Eloisa Salina Borello, Gert Jan Weltje, and Rory Dalman. "Increasing the predictive power of geostatistical reservoir models by integration of geological constraints from stratigraphic forward modeling." Marine and Petroleum Geology 69 (2016): 112-126.
Santoshini S, Harris S, Kashem S, Levannier A, Benabbou A, Viard T, Mace L. Depogrid: Next Generation Unstructured Grids for Accurate Reservoir Modeling and Simulation. InSPE Russian Petroleum Technology Conference Oct. 15, 2018. Society of Petroleum Engineers. 20 pages.
Scheevel et al., Principal Component Analysis Applied to 3D Seismic Data for Reservoir Property Estimation, Feb. 1, 2001, SPE Reservoir Evaluation & Engineering 4 (01), pp. 64-72 (Year: 2001).
Tahmasebi et al. Multiple-point geostatistical modeling based on the cross-correlation 1-15 functions. Mar. 8, 2012 (Mar. 8, 2012). [retrieved on Mar. 5, 2021]. Retrieved from the Internet: <URL: http://www.uwyo.edu/pejman/_files/docs/tahmasebi_ccsim.pdf> pp. 779-796.
Weltje, Gert Jan, Rory Dalman, Pantelis Karamitopoulos, and Quinto Sacchi. "Reducing the uncertainty ofstatic reservoir models: implementation of basin-scale geological constraints." In EAGE Annual Conference & Exhibitionincorporating SPE Europec. OnePetro, 2013 (Year: 2013).
Yupeng, Li, and Wu Shenghe. "Hierarchical nested simulation approach in reservoir architecture modeling." Petroleum Exploration and Development 40, No. 5 (2013): 676-681.
Zhou et al. A Stratigraphic Prediction Method Based on Machine Learning. Aug. 29, 2019 (Aug. 29, 2019). [retrieved on Mar. 5, 2021]. Retrieved from the Internet: <URL: https://www.mdpi.com/2076-3417/9/17/3553/pdf> pp. 1-29.
Zhou et al. A Stratigraphic Prediction Method Based on Machine Learning. Aug. 29, 2019 1-15 (Aug. 29, 2019). (retrieved on Mar. 5, 2021]. Retrieved from the Internet: <URL: https://www.mdpi.com/2076-3417/9/17/3553/pdf> pp. 1-29.
Ou et al. "Fine reservoir structure modeling based upon 3D visualized stratigraphic correlation between horizontal wells: methodology and its application" Journal of Geophysics and Engineering J. Geophys Eng. 14 (2017) 1557-1571 (15pp). (Year: 2017).
Bourdarot, Gilles, Hocine Khemissa, Abdullah Al Shemsi, Bruno Murat, Remy Richet, Federico Games, and Florent Porcher. "Sedimentology Genetic Modeling of an Offshore Abu Dhabi Carbonate Reservoir." In Abu Dhabi International Petroleum Exhibition and Conference. OnePetro, 2014 (Year: 2014).
Slomka, J. M., K. E. Maccormack, and C. H. Eyles. Preservation of local high-resolution data in a regional low-resolution dataset: a 'nested'3D modeling approach using an example from a Quaternary glacial stratigraphy (Ontario, Canada). Engineering Geology 248 (2019): 309-329 (Year: 2019).
Rockworks: "RockWorks 14", Mar. 31, 2008, XP055303277, Retrieved from the Internet: URL:https://www.rockware.corn/assets/products/165/downloads/documentation/35/rw14 manual.pdf [retrieved on Sep. 16, 2016].
PCT Search Report and Written Opinion for PCT Application No. PCT/US2023/019114, mailed Aug. 10, 2023 (9 pages).
Hantschel, Thomas, and Armin I. Kauerauf. Fundamentals of basin and petroleum systems modeling. (Springer Science & Business Media 2009). p. 286. ISBN 978-3-540-72317-2. (Year: 2009).
Laigle, L., Pierre Joseph, G. De Marsily, and S. Violette. "3-D process modelling of ancient storm-dominated deposits by an event-based approach: application to Pleistocene-to-modern Gulf of Lions deposits." (ScienceDirect 2013) Marine Geology 335: 177-199. (Year: 2013).
Al Ibrahim Mustafa, et al "Multi-scale sequence stratigraphy, cyclostratigraphy, and depositional environment of carbonate mudrocks in the Tuwaiq Mountain and Hanifa Formations, Saudi Arabia" Jan. 1, 2014 (Jan. 1, 2014) XP055868934 (208 pages).
Emery, Xavier. "On some consistency conditions for geostatistical change-of-support models." Mathematical geology 39.2 (2007): (205-223).
Fan, W., Liu, G., Chen, Q., Cui, Z., Fang, H., Chen, G., & Wu, X. (2024). Automatic reconstruction of geological reservoir models based on conditioning data constraints and BicycleGAN. Geoenergy Science and Engineering, 234, 212690. https://doi.org/10.1016/j.geoen.2024.212690, 21 pages.
Pan, W., Chen, J., Mohamed, S., Jo, H., Santos, J. E., & Pyrcz, M. J. (2023). Efficient Subsurface Modeling with Sequential Patch Generative Adversarial Neural Networks. Paper presented at the SPE Annual Technical Conference and Exhibition, San Antonio, Texas, USA. https://doi.org/10.2118/214985-MS, 17 pages.

(56) References Cited

OTHER PUBLICATIONS

Pan, W., Jo, H., Santos, J. E., Torres-Verdfn, C., & Pyrcz, M. J. (2022). Hierarchical machine learning workflow for conditional and multiscale deep-water reservoir modeling. AAPG Bulletin, 106( 11 ), 2163-2186. https://doi.org/10.1306/05162221022.

Ringrose, Philip S., Allard W. Martinius, and Jostein Alvestad, "Multiscale geological reservoir modelling in practice." Geological Society, London, Special Publications 309.1;(2008); (123-134).

Sun, C., Demyanov, V., & Arnold, D. (2023). Geological realism in Fluvial facies modelling with GAN under variable depositional conditions. Computational Geosciences, 27, 203-221. https://doi.org/10.1007 /s 10596-023-10190-w, 32 pages.

Zhang, T. F., Tilke, P., Dupont, E., et al. (2019). Generating geologically realistic 3D reservoir facies models using deep learning of sedimentary architecture with generative adversarial networks. Petroleum Science, 16, 541-549. https://doi.org/10.1007/s12182-019-0328-4, 11 pages.

Extended European Search Report from EP Application No. 21741102.4 mailed Jan. 25, 2025 (9 pages).

Liu Yuhua et al: "Visual Analytics of Stratigraphic Correlation for Multi-Attribute Well-Logging Data Exploration", IEEE Access, vol. 7, Jul. 16, 2019.

Examination Report No. 2 dated Jun. 25, 2026 for Australian Application No. 2023260447.

* cited by examiner

Obtain subsurface representation information, the subsurface representation information defining a set of subsurface representations, the set of subsurface representations defining subsurface configurations in layer space such that the subsurface configurations are defined as a function of layers — 202

Train a machine learning model using the set of subsurface representations within the layer space, wherein the trained machine learning model generates synthetic subsurface representations in the layer space — 204

Store the trained machine learning model in a storage medium — 206

FIG. 2A

MACHINE LEARNING APPROACH FOR GENERATING SUBSURFACE REPRESENTATIONS IN LAYER-SPACE

FIELD

The present disclosure relates generally to the field of generating synthetic subsurface representations in layer space.

BACKGROUND

Portions of subsurface representations may be extracted to generate a new subsurface representation. For example, stratigraphic patterns from subsurface representations that match observed data from wells may be extracted and combined to generate a new subsurface representation. However, existing patterns within subsurface representations may not be sufficient to match all types of observed data, which may result in artifacts in the newly generated subsurface representation.

SUMMARY

This disclosure relates to generating synthetic subsurface representations. Subsurface representation information and/or other information may be obtained. The subsurface representation information may define a set of subsurface representations. The set of subsurface representations may define subsurface configurations in layer space such that the subsurface configurations are defined as a function of layers. A machine learning model may be trained using the set of subsurface representations within the layer space and/or other information. The trained machine learning model may generate the synthetic subsurface representations in the layer space. The trained machine learning model may be stored in a storage medium.

A system for generating synthetic subsurface representations may include one or more electronic storage, one or more processors and/or other components. The electronic storage may store subsurface representation information, information relating to subsurface representations, information relating to layer space, information relating to physical space, information relating to machine learning models, information relating to training of machine learning models, information relating to trained machine learning models, conditioning information, information relating to conditioning characteristics, information relating to synthetic subsurface representations, and/or other information.

The processor(s) may be configured by machine-readable instructions. Executing the machine-readable instructions may cause the processor(s) to facilitate generating synthetic subsurface representations. The machine-readable instructions may include one or more computer program components. The computer program components may include one or more of a subsurface representation information component, a train component, a storage component, a conditioning information component, a generation component, and/or other computer program components.

The subsurface representation information component may be configured to obtain subsurface representation information and/or other information. The subsurface representation information may define a set of subsurface representations. The set of subsurface representations may define subsurface configurations. The set of subsurface representations may define the subsurface configurations in layer space such that the subsurface configurations are defined as a function of layers.

The train component may be configured to train a machine learning model. The machine learning model may be trained using the set of subsurface representations within the layer space and/or other information. The trained machine learning model may generate synthetic subsurface representations in the layer space. In some implementations, the machine learning model may include a generative neural network and/or other neural network.

In some implementations, training of the machine learning model using a subsurface representation within the layer space may include use of a moving window. The moving window may be used to extract portions of the subsurface representation within the layer space for use in training the machine learning model. In some implementations, subsurface structures and subsurface properties from the extracted portions of the subsurface representation within the layer space may be used to train the machine learning model.

The storage component may be configured to store the trained machine learning model. The trained machine learning may be stored in a storage medium.

The conditioning information component may be configured to obtain conditioning information and/or other information. The conditioning information may define one or more conditioning characteristics of a subsurface region. In some implementations, the conditioning characteristic(s) may be defined in physical space such that the conditioning characteristic(s) are defined as a function of depth. The conditioning characteristic(s) may be converted from the physical space to the layer space such that the conditioning characteristic(s) are defined as the function of layers.

The generation component may be configured to generate one or more synthetic subsurface representations for a subsurface region. The synthetic subsurface representation(s) may be generated using the trained machine learning model. The synthetic subsurface representation(s) may be generated using the trained machine learning model to match the conditioning characteristic(s) of the subsurface region. The synthetic subsurface representation(s) for the subsurface region may be generated by the trained machine learning model within the layer space.

In some implementations, generation of a synthetic subsurface representation for a subsurface region by the trained machine learning model may include generation of subsurface structures and subsurface properties of the subsurface region. The subsurface structures of the subsurface region may be defined by layer thickness and the subsurface properties of the subsurface region may be defined by grain size.

In some implementations, a synthetic subsurface representation within the layer space may be generated by the trained machine learning model based on input of a latent space vector to the trained machine learning model. Conditioning of the trained machine learning model may be performed in latent space.

In some implementations, determination of whether a synthetic subsurface representation for the subsurface region matches the conditioning characteristic(s) may be performed within the layer space.

In some implementations, a synthetic subsurface representation may be converted from the layer pace to the physical space. Determination of whether the synthetic subsurface representation for the subsurface region matches the conditioning characteristic(s) may be performed within the physical space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2A illustrates an example method for generating synthetic subsurface representations.

DETAILED DESCRIPTION

The present disclosure relates to generating synthetic subsurface representations. Subsurface representations that define subsurface configurations in layer space are used to train a machine learning model. The trained machine learning model is used to generate synthetic subsurface representations in the layer space. The synthetic subsurface representations are generated to match one or more conditioning characteristics. Conditioning of the trained machine learning model is performed in latent space.

Figure 1:
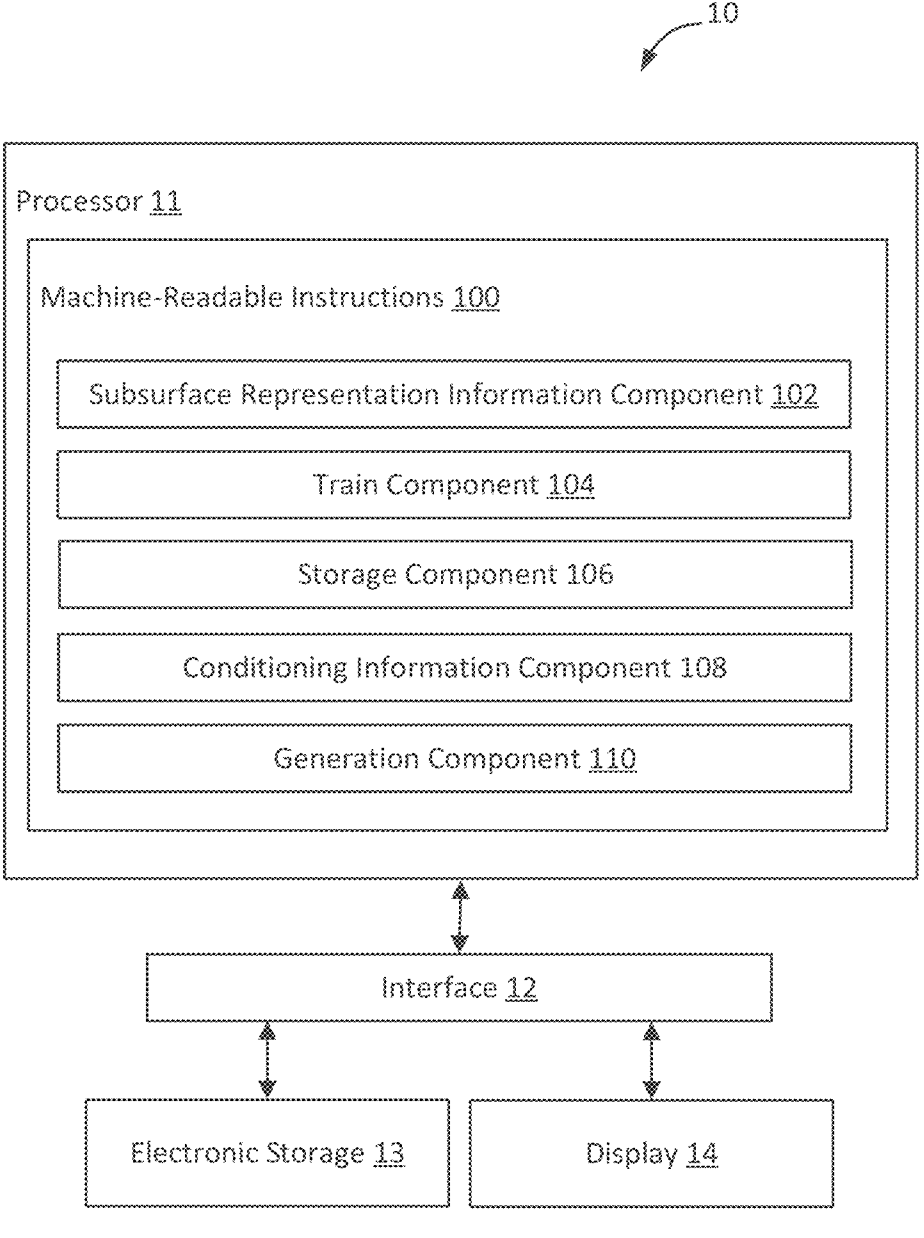
FIG. 1 illustrates an example system for generating synthetic subsurface representations.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Subsurface representation information and/or other information may be obtained by the processor 11. The subsurface representation information may define a set of subsurface representations. The set of subsurface representations may define subsurface configurations in layer space such that the subsurface configurations are defined as a function of layers. A machine learning model may be trained by the processor 11 using the set of subsurface representations within the layer space and/or other information. The trained machine learning model may generate the synthetic subsurface representations in the layer space. The trained machine learning model may be stored by the processor 11 in a storage medium.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store subsurface representation information, information relating to subsurface representations, information relating to layer space, information relating to physical space, information relating to machine learning models, information relating to training of machine learning models, information relating to trained machine learning models, conditioning information, information relating to conditioning characteristics, information relating to synthetic subsurface representations, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present subsurface representation information, information relating to subsurface representations, information relating to layer space, information relating to physical space, information relating to machine learning models, information relating to training of machine learning models, information relating to trained machine learning models, conditioning information, information relating to conditioning characteristics, information relating to synthetic subsurface representations, and/or other information.

Subsurface representations may be used to model behaviors of subsurface regions. For example, a subsurface representation of a reservoir may be used to model fluid flow behavior within the reservoir. Accurately modeling small-scale and continuous features (e.g., thin flow barriers and baffles) in the subsurface representation may be critical in accurately modeling fluid flow behavior within the reservoir and for the ability of the subsurface representation to history match production data.

Physics-based modeling, such as Computational Stratigraphy, may be used to generate subsurface representations that capture such small-scale yet continuous subsurface features. However, generation of subsurface representations using a physics-based modeling approach may be difficult as such techniques may be unable to capture all hard data (e.g., observed data, conditioning data) that are to be matched in the generated subsurface representation. Extracting portions of such subsurface representations to generate new subsurface representations may result in artifacts due to mismatch between the extracted portions and the hard data. Additionally, the physics-based modeling approach may be high dimensional (parameters for generation and high cell count), which may not be conducive for assisted history matching methods. Latent space may reduce the high cell count into a lower dimension.

The present disclosure enables generation of subsurface representations that match conditioning characteristics while preserving small-scale and continuous subsurface features. Additionally, the present disclosure provides low dimensional parameterization of subsurface modeling. The low dimensional parameterization of subsurface modeling may be used with history matching techniques for matching dynamic data.

Figure 3:
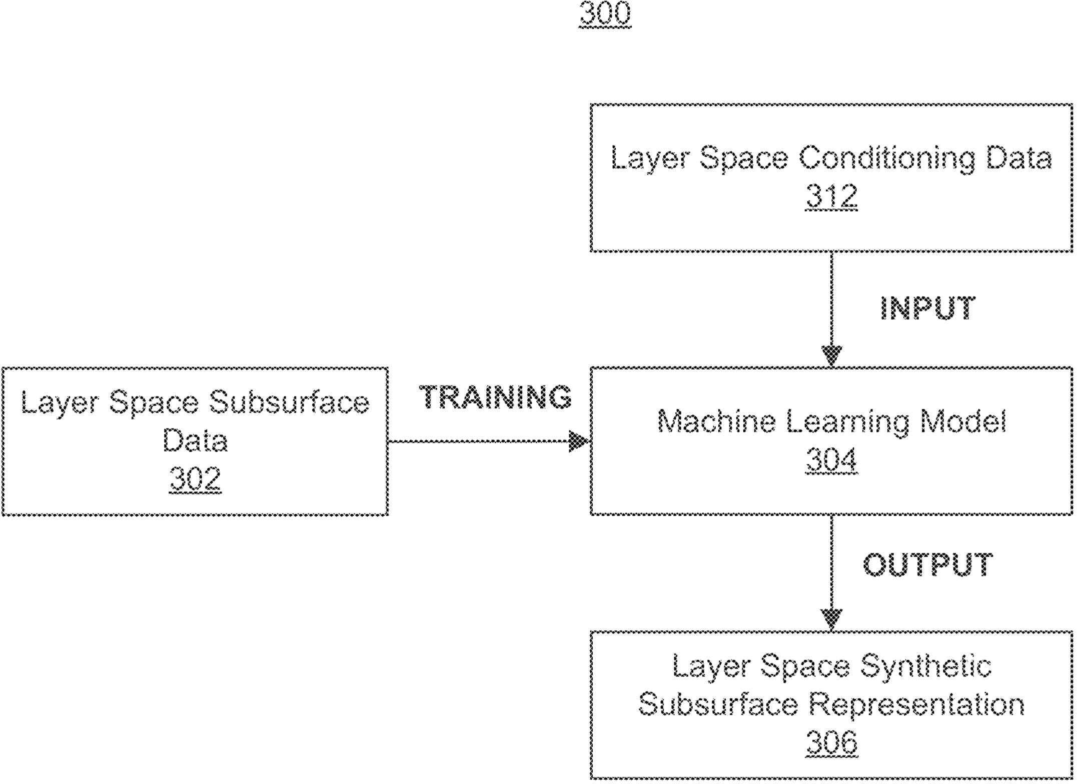
FIG. 3 illustrates an example process for generating synthetic subsurface representations

FIG. 3 illustrates an example process 300 for generating synthetic subsurface representations. In the process 300, layer space subsurface data 302 may be obtained. The layer space subsurface data may include subsurface representations of subsurface regions. The subsurface representations may define subsurface configurations in layer space, rather than physical space. The subsurface representations may provide information about subsurface features as a function of layers, rather than as a function of depth.

The layer space subsurface data 302 may be used to train a machine learning model 304. The machine learning model 304 may include one or more generative neural networks, such as a generative adversarial network and/or an autoencoder. The machine learning model 304 may be trained in layer space to generate a synthetic subsurface representations in the layer space. The machine learning model 304 may be trained to generate subsurface representations like the subsurface representations in the training data (the layer space subsurface data 302). Generation of synthetic subsurface representations in the layer space enables small-scale and continuous subsurface features to be accurately generated.

Layer space conditioning data 312 may be obtained. The layer space conditioning data 312 may include hard data that is to be matched in synthetic subsurface representations generated by the machine learning model 304. The layer space conditioning data 312 may provide information about hard data as a function of layers. The layer space conditioning data 312 may include hard data from one or more points, one or more lines, one or more surfaces, one or more laterals/rows, one or more verticals/columns, and/or one or more volumes within a subsurface region. The layer space conditioning data 312 may also include soft data that is used to guide generation of the synthetic subsurface representations by the machine learning model 304. For example, the layer space conditioning data 312 may include soft data that is used to guide overall trend and/or shape of the synthetic subsurface representations generated by the machine learning model 304. Soft data may be obtained from correlated volumes within the subsurface region. For example, soft data may include trends extracted from seismic data, analogs, and/or other geological constraints.

The layer space conditioning data 312 may be input into the machine learning model 304, and the machine learning model 304 may output a layer space synthetic subsurface representation 306. The layer space synthetic subsurface representation 306 output by the machine learning model 304 may match the layer space conditioning data 312.

The machine learning model 304 may use fewer number of parameters to generate synthetic subsurface representations than the physics-based modeling used to generate the subsurface representations. The high-dimensional nature of the physics-based modeling may make it difficult for the physics-based modeling to be used to generate subsurface representations that match conditioning data. The machine learning model 304 may provide a low dimension parameterization, which may make it easier to the machine learning model 304 to be used to generate synthetic subsurface representations that match conditioning data.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating synthetic subsurface representations. The machine-readable instructions 100 may include one or more computer program components. The machine-readable instructions 100 may include a subsurface representation information component 102, a train component 104, a storage component 106, a conditioning information component 108, a generation component 110, and/or other computer program components.

The subsurface representation information component 102 may be configured to obtain subsurface representation information and/or other information. Obtaining subsurface representation information may include one or more of accessing, acquiring, analyzing, creating, determining, examining, generating, identifying, loading, locating, measuring, opening, receiving, retrieving, reviewing, selecting, storing, utilizing, and/or otherwise obtaining the subsurface representation information. The subsurface representation information component 102 may obtain subsurface representation information from one or more locations. For example, the subsurface representation information component 102 may obtain subsurface representation information from a storage location, such as the electronic storage 13, electronic storage of a device accessible via a network, and/or other locations. The subsurface representation information component 102 may obtain subsurface representation information from one or more hardware components (e.g., a computing device, a component of a computing device) and/or one or more software components (e.g., software running on a computing device). Subsurface representation information may be stored within a single file or multiple files.

The subsurface representation information may define a set of subsurface representations. A set of subsurface representations may include multiple subsurface representations. The subsurface representation information may define the subsurface representations within the set of subsurface representations. The subsurface representation information may define a subsurface representation by including information that describes, delineates, identifies, is associated with, quantifies, reflects, sets forth, and/or otherwise defines one or more of content, quality, attribute, feature, and/or other aspects of the subsurface representation. For example, the subsurface representation information may define a subsurface representation by including information that makes up the content of the subsurface representation and/or information that is used to identify/determine the content of the subsurface representation. Other types of subsurface representation information are contemplated.

A subsurface representation may refer to a computer-generated representation of a subsurface region, such as a one-dimensional, two-dimensional, and/or three-dimensional model of a subsurface region. A subsurface representation may be defined by and/or include the subsurface configurations simulated by one or more subsurface models. A subsurface representation may be used as and/or may be referred to as a digital analog. A subsurface representation may include geologically plausible arrangement of rock obtained from a modeling process (e.g., stratigraphic forward modeling process). A subsurface representation may define subsurface configuration at different locations within a subsurface region.

A subsurface region may refer to a part of earth located beneath the surface/located underground. A subsurface region may refer to a part of earth that is not exposed at the surface of the ground. A subsurface region may be defined in a single dimension (e.g., a point, a line) or in multiple dimensions (e.g., a surface, a volume). A subsurface region may include a physical subsurface region, such as a region in the real world, or a virtual subsurface region, such as a subsurface representation generated/simulated using one or more computer models (e.g., computational stratigraphy models).

The set of subsurface representations may define subsurface configurations of subsurface regions. Subsurface configuration may refer to attribute, quality, and/or characteristics of a subsurface region. Subsurface configuration may refer to physical arrangement of materials (e.g., subsurface elements) within a subsurface region. Examples of subsurface configuration simulated by a subsurface model may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures.

A subsurface model may refer to a computer model (e.g., program, tool, script, function, process, algorithm) that generates subsurface representations. A subsurface model may simulate subsurface configuration within a region underneath the surface (subsurface region). A subsurface model may simulate subsurface configurations by generating one or more subsurface representations. An example of a subsurface model is a computational stratigraphy model. A computational stratigraphy model may refer to a computer model that simulates depositional and/or stratigraphic processes on a grain size scale while honoring physics-based flow dynamics. A computational stratigraphy model may simulate rock properties, such as velocity and density, based on rock-physics equations and assumptions. Input to a computational stratigraphy model may include information relating to a subsurface region to be simulated. For example, input to a computational stratigraphy model may include paleo basin floor topography, paleo flow and sediment inputs to the basin, and/or other information relating to the basin. In some implementations, input to a computational stratigraphy model may include one or more paleo geologic controls, such as climate changes, sea level changes, tectonics and other allocyclic controls. Output of a computational stratigraphy model may include one or more subsurface representations. A subsurface representation generated by a computational stratigraphy model may be referred to as a computational stratigraphy model representation.

A computational stratigraphy model may include a forward stratigraphic model. A forward stratigraphic model may be an event-based model, a process mimicking model, a reduced physics based model, and/or a fully physics based model (e.g., fully based on physics of flow and sediment transport). A forward stratigraphic model may simulate one or more sedimentary processes that recreate the way stratigraphic successions develop and/or are preserved. The forward stratigraphic model may be used to numerically reproduce the physical processes that eroded, transported, deposited and/or modified the sediments over variable time periods. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data. Usage of other subsurface models and other subsurface representations are contemplated.

A subsurface representation may define subsurface configuration. A subsurface representation may define subsurface configuration in layer space such that the subsurface configuration is defined as a function of layers. The vertical dimension in layer space may be layers, rather than physical distance, such as depth. While information in the physical space may be defined as a function of physical distance, such as depth (e.g., depth measured from the surface, the sea floor, a particular layer, an arbitrary location), information in the layer space may be defined as a function of layers. The lateral dimension in the layer space may be physical distance.

The layers may be divided into cells, and the cells may be used to convey information relating to the corresponding portions of the subsurface configurations. For example, the cells may include and/or be associated with information on the thickness of the layer (thickness between two consecutive layers) at the corresponding location, as well as one or more subsurface properties at the corresponding location. A subsurface property may refer to property (e.g., characteristic, trait) of materials in a subsurface region. Examples of subsurface properties include grain size, grain type, grain lithology, porosity, permeability, and/or other properties of materials in a subsurface region. Subsurface properties may include one or more geological, petrophysical, geophysical, and/or stratigraphic properties.

In some implementations, obtaining a subsurface representation that defines subsurface configuration in layer space may include (1) obtaining a subsurface representation that defines subsurface configuration in physical space, and (2) converting the subsurface representation from the physical space to the layer space such that the subsurface configuration is defined as the function of layers. Conversion of a subsurface representation from the physical space to the layer space may include change in the vertical dimension used to define the subsurface configuration. Conversion of a subsurface representation from the physical space to the layer space may include change in the vertical dimension from depth (distance) into layers. The lateral dimensions of the subsurface representation may not be changed by the conversion between the physical space and the layer space.

Subsurface data (data relating to a subsurface region) in the physical space may provide and/or define information as a function of spatial location, such as depth into the ground. For example, subsurface data in the physical space may define different types, shapes, and/or properties of materials and/or layers as a function of depth into the ground. Subsurface data in the layer space may provide and/or define information as a function of layers (e.g., rock layers) rather than as a function of depth. For example, subsurface data in the layer space may define different types, shapes, and/or properties of materials a function of layers in the ground. For instance, the subsurface data in the layer space may define thickness of layers (e.g., thickness of sedimentary rock) and other layer properties as a function of layer (and the lateral spatial location). For example, the subsurface data in the layer space may define the thickness of sedimentary rock and other rock properties for different layers at x-y locations.

In some implementations, information on generation of a subsurface representation (e.g., layer-by-layer building based on deposition times by a subsurface model) may be used to convert the subsurface representation between the physical space and the layer space. Conversion of subsurface data between the physical space to the layer space may not include a straight conversion of depth to layer. For example, conversion of subsurface data from the physical space to the layer space may group subsurface data based on being located within the same layer, rather than being located at the same depth. Conversion of other subsurface data is contemplated.

Figure 4:
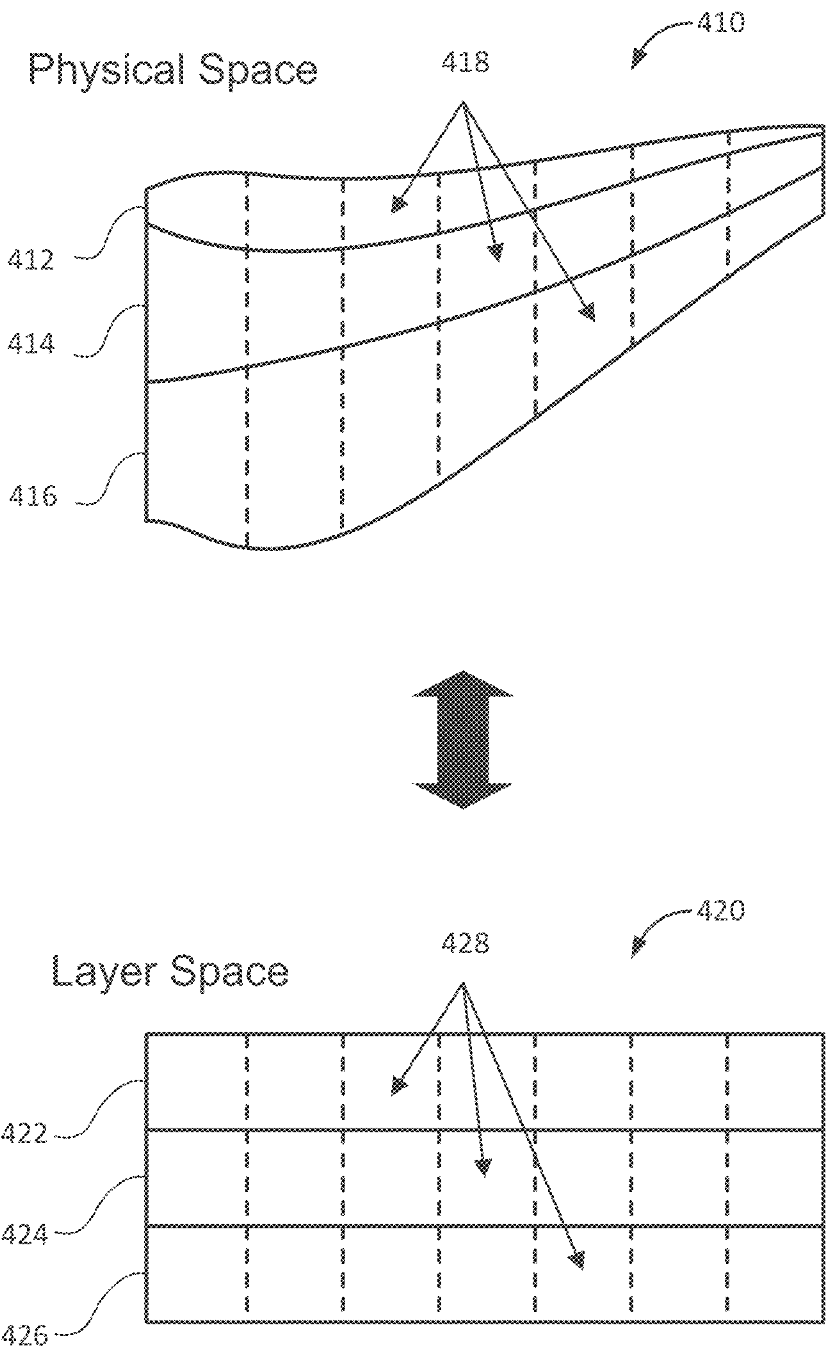
FIG. 4 illustrates an example conversion of subsurface data between physical space and layer space.

FIG. 4 illustrates an example conversion of subsurface data between physical space and layer space. FIG. 4 includes a physical space representation 410 of a subsurface region in the physical space and a layer space representation 420 of the subsurface region in the layer space. The vertical dimension of the physical space representation 410 in the physical space may be depth (distance). In the physical space representation 410, the subsurface configurations of the subsurface region may be defined as a function of depth (e.g., under the ground, from sea floor, from a particular layer, from an arbitrary location). The subsurface region in the physical space may include layers 412, 414, 416. The layers 412, 414, 416 may include rocks layers that are arranged on top of one another. The layers 412, 414, 416 may have been deposited at different times. The layers 412, 414, 416 may be divided into cells 418.

The vertical dimension of the layer space representation 420 of subsurface region in the layer space may be layers. In the layer space representation 420, the subsurface configurations of the subsurface region may be defined as a function of layer, instead of depth. The layer space representation 420 may include the subsurface region divided/separated in area-layer rather than area-depth as shown in the physical space representation 410. The subsurface region in the layer space may include layers 422, 424, 426 (e.g., computational stratigraphy model grid layers). The layers 422, 424, 426 may be divided into cells 428. The layer 422 may correspond to the layer 412, the layer 424 may correspond to the layer 414, and the layer 426 may correspond to the layer 416. Individual cells 428 may correspond to individual cells 418.

Conversion of the subsurface region from the physical space to the layer space may result in layers of differing thicknesses and shapes being represented by uniform layers in the layer space. For example, the upper right cell in the physical space representation 410 of the subsurface region may be thin/small and computations of subsurface data associated with such thin/small portions may be difficult. The corresponding upper right cell in the layer space representation 420 is larger, and the computation becomes easier to perform in the layer space compared to in the physical space. Individual cells of the layer space representation 420 may include information on thickness of the corresponding cells in the physical space representation 410. That is, individual cells of the layer space representation 420 may store information on how thick that part of the layer is in the real world. Individual cells of the layer space representation 420 may include other information on the subsurface properties of the corresponding cells in the physical space representation 410, such as include grain size, grain type, grain lithology, porosity, and/or permeability.

Conversion of the subsurface representation from the layer space to the physical space may result in the subsurface representation simulating how the corresponding subsurface region would appear in the real world. Information on thickness of individual cells may be used to build the physical space representation layer by layer or column by column. A known location in the physical space (e.g., top surface, bottom surface, surface within the subsurface region) may be used as the base from which the subsurface representation is built.

For example, information on thickness of layers stored in individual cells of the layer space representation 420 may be used to perform conversion of the layer space representation 420 to the physical space representation 410. The top of the physical space representation 410 may be used as the base, and thickness of individual cells in the top-most layer of the layer space representation 420 may be used to determine how far the cells/layer extend below the top—build portions of the layer by subtracting the thickness of the cells from the top. Other layers may be added below. The bottom of the physical space representation 410 may be used as the base, and thickness of individual cells in the bottom-most layer of the layer space representation 420 may be used to determine how far the cells/layer extend above the bottom—build portions of the layer by adding the thickness of the cells to the bottom. Other layers may be added above. An intermediate surface within the physical space representation 410 may be used as the base, and the thickness of individual cells in the layer below the surface may be used to determine how far the cells/layer extend below the surface while the thickness of individual cells in the layer above the surface may be used to determine how far the cells/layer extend above the surface. Layers may be built on top/below each other by accumulating the thickness information stored in the cells of the layer space representation 420.

Figure 5:
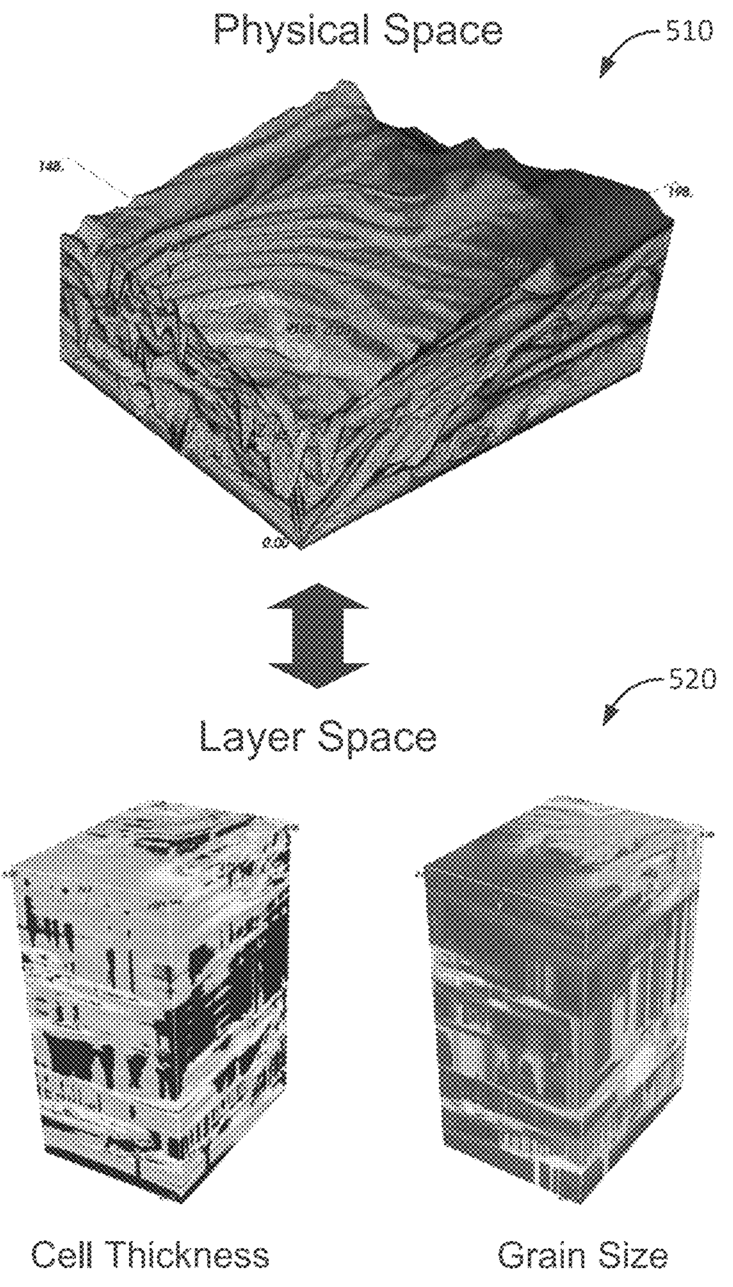
FIG. 5 illustrates an example conversion of a subsurface representation between physical space and layer space.

FIG. 5 illustrates an example conversion of a subsurface representation between physical space and layer space. FIG. 5 includes a physical space representation 510 of a subsurface region in the physical space and a layer space representation 520 of the subsurface region in the layer space. The vertical dimension of the physical space representation 510 in the physical space may be depth (distance) and the vertical dimension of the layer space representation 520 in the layer space may be layers. The physical space representation 510 and/or the layer space representation 520 may be divided into cells.

The layer space representation 520 of the subsurface region in the layer space may include multiple representations to define different properties of the subsurface region. For a given physical space representation, conversion into the layer space may result in representations that define stratigraphic cell thicknesses and the corresponding subsurface properties of interest for individual cells. For example, as shown in FIG. 5, layer space representation 520 in the layer space may include a representation of cell thickness and a representation of grain size. Generation of representations for other subsurface properties (e.g., porosity, permeability) are contemplated. In some implementations, different subsurface properties may be stored in different data channels of the layer space representation. For example, a cell of a layer space representation may include multiple data channels, with one data channel including information on corresponding cell thickness and other data channels including information on corresponding subsurface properties of interest.

The train component 104 may be configured to train one or more machine learning models. In some implementations, the machine learning model(s) may include a generative neural network, such as a generative adversarial network, an autoencoder, and/or other neural network. The machine learning model(s) may be trained using the set of subsurface representations within the layer space and/or other information. Training the machine learning model(s) in the layer space may enable small-scale and continuous features to be modeled accurately by the trained machine learning model(s). The trained machine learning model(s) may generate synthetic subsurface representations in the layer space. A synthetic subsurface representation may refer to a subsurface representation that has been generated to simulate subsurface configuration of a subsurface region. The trained machine learning model(s) may populate volumes of layer thickness and other subsurface properties for cells within different layers.

Training a machine learning model may include facilitating learning by the machine learning model by processing the set of subsurface representations within the layer space through the machine-learning model. The set of subsurface representations may be provided to a machine learning model as examples of output to be generated by the machine learning model. For example, a machine learning model may include a generative adversarial network, which includes a generator (convolutional neural network) and a discriminator (deconvolutional neural network). Multiple layer space subsurface representations may be used as examples of output to be generated by the generator. The output of the generator may be compared with the original layer space subsurface representations to determine the accuracy of the generator in producing outputs. The machine learning model may be trained until a threshold accuracy is reached by the generator in producing output (e.g., trained until the discriminator cannot distinguish between original subsurface representations and synthetic subsurface representations generated by the generator).

The generator may receive a latent space vector and output a synthetic subsurface representation based on the latent space vector. The latent space vector may be a low dimensional vector. The latent space vector may serve as a low dimensional parameterization of the subsurface representation generation. The latent space vector may be used to condition the synthetic subsurface representation generated by the trained machine learning model to hard data, as well as for performing history matching (e.g., assisted history matching).

In some implementations, training of a machine learning model using a subsurface representation within the layer space may include use of the entire subsurface representation to train the machine learning model. The entirety of the subsurface representation may be provided as example of an output to be generated by the machine-learning model.

In some implementations, training of a machine learning model using a subsurface representation within the layer space may include use of a moving window. A moving window may refer to a shape that is moved over the subsurface representation to extract different portions of the subsurface representation. The moving window may be used to extract portions of the subsurface representation within the layer space for use in training the machine learning model. Portions of the subsurface representation may be provided as examples of outputs to be generated by the machine-learning model. Use of other mechanisms to extract portions of the subsurface representation for training of the machine learning model are contemplated.

The dimension of the moving window may depend on the dimension of the subsurface representation. For example, for a two-dimensional subsurface representation, a two-dimensional moving window (e.g., square, rectangle) may be used. For a three-dimensional subsurface representation, a three-dimensional moving window (e.g., cube, rectangular prism) may be used. Other dimensions of subsurface representation and moving window are contemplated.

In some implementations, subsurface structures and subsurface properties from the subsurface representation/the extracted portions of the subsurface representation within the layer space may be used to train a machine learning model. Subsurface structure may refer to an arrangement of and/or relationship between materials in the subsurface region. Subsurface structure may refer to shape and/or location of layers in the subsurface region. For example, the subsurface structures of the subsurface region may be defined by layer thickness and the subsurface properties of the subsurface region may be defined by grain size. The layer thickness and grain size of from the subsurface representation/the extracted portions of the subsurface representation within the layer space may be used to train a machine learning model. Such training of a machine learning model may enable the trained machine learning model to simulate both subsurface structures and subsurface properties.

The storage component 106 may be configured to store the trained machine learning model(s). The trained machine learning may be stored in a storage medium (e.g., one or more non-transitory storage media and/or other storage media). For example, the storage component 106 may store the trained machine learning model(s)/information defining the trained machine learning model(s) in a storage location, such as the electronic storage 13, electronic storage of a device accessible via a network, and/or other locations. The trained machine learning model(s) may be stored for use in generating synthetic subsurface representations. The trained machine learning model(s) may be stored for retrieval/running when generating synthetic subsurface representations.

The conditioning information component 108 may be configured to obtain conditioning information and/or other information. Obtaining conditioning information may include one or more of accessing, acquiring, analyzing, creating, determining, examining, generating, identifying, loading, locating, measuring, opening, receiving, retrieving, reviewing, selecting, storing, utilizing, and/or otherwise obtaining the conditioning information. The conditioning information component 108 may obtain conditioning information from one or more locations. For example, the conditioning information component 108 may obtain conditioning information from a storage location, such as the electronic storage 13, electronic storage of a device accessible via a network, and/or other locations. The conditioning information component 108 may obtain conditioning information from one or more hardware components (e.g., a computing device, a component of a computing device) and/or one or more software components (e.g., software running on a computing device). Conditioning information may be stored within a single file or multiple files.

The conditioning information may define one or more conditioning characteristics of a subsurface region. A conditioning characteristic may refer to subsurface feature, quantity, and/or quality that is desired to be preserved within synthetic subsurface representations. For example, a conditioning characteristic may refer to geological characteristics, geophysical characteristics, and/or other subsurface characteristics. Conditioning characteristics may define the guides and/or the fixed points in generating synthetic subsurface representations. Conditioning characteristics may include subsurface feature, quantity, and/or quality of one or more subsurface points, areas, and/or volumes of interest. Conditioning characteristics may be referred to as hard data. In some implementations, conditioning characteristics may include geological characteristics, petrophysical characteristics, geophysical characteristics, seismic characteristics, and/or other subsurface characteristics.

For example, conditioning characteristics may include one or more rock properties (e.g., rock types, layers, grain sizes, porosity, permeability) that are to be preserved within synthetic subsurface representations and/or to be used as guides in generating synthetic subsurface representations.

The rock properties may define fixed points from which synthetic subsurface representations are generated. Usage of other subsurface properties as conditioning characteristics are contemplated.

The conditioning information may define a conditioning characteristic by including information that describes, delineates, identifies, is associated with, quantifies, reflects, sets forth, and/or otherwise defines one or more of content, quality, attribute, feature, and/or other aspects of the conditioning characteristic. For example, the conditioning information may define a conditioning characteristic by including information that makes up the conditioning characteristic and/or information that is used to identify/determine the conditioning characteristic. Other types of conditioning information are contemplated.

In some implementations, the condition information may define conditioning characteristics at one or more points, one or more lines, one or more surfaces, one or more laterals/rows, one or more verticals/columns, and/or one or more volumes within a subsurface region. Conditioning characteristics may be defined at other locations within a subsurface region.

In some implementations, the conditioning information may be determined based on one or more well logs, interpreted seismic information (including data or data sets), and/or other information. For example, the conditioning information may include information obtained from borehole logging of the well and may include a record of geologic formations penetrated by a borehole (e.g., geologic formations within/surrounding the well). As another example, the conditioning information may include information obtained from well cores (e.g., rock samples collected as part of drilling process) and/or other seismic information. The well cores/seismic information may provide information on one or more properties of the drilled rocks, such as rock types, layers, grain sizes, porosity, and/or permeability. For example, conditioning characteristics may include and/or may be determined based on rock types, layers, grain sizes, porosity, and/or permeability of one or more wells of interest.

In some implementations, the conditioning characteristic(s) may be defined in physical space such that the conditioning characteristic(s) are defined as a function of spatial location, such as depth. The conditioning information may define conditioning characteristic(s) in the physical space such that the conditioning characteristic(s) are defined as a function of vertical spatial location (e.g., depth), lateral spatial location (e.g., x-y coordinate in map view), and/or other spatial locations.

The conditioning characteristic(s) may be converted from the physical space to the layer space such that the conditioning characteristic(s) are defined as the function of layers. The conditioning characteristic(s) may be converted into layer space for use by the trained machine learning model. The conditioning characteristic(s) may be converted into layer space to perform conditioning of the trained machine learning model.

Figure 6:
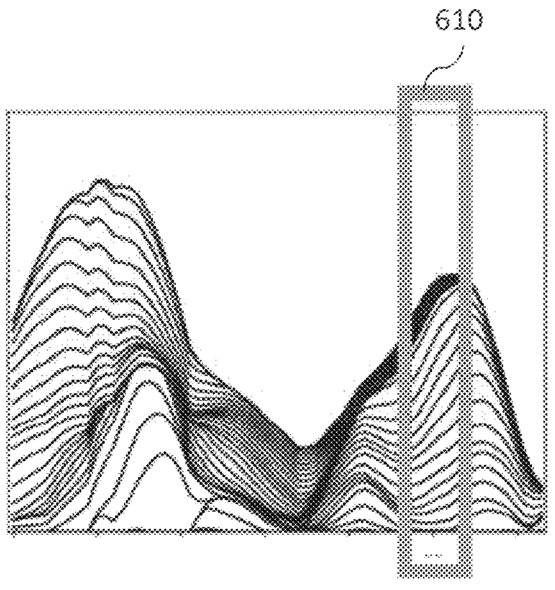
FIG. 6 illustrates example conditioning data.
Figure 6:
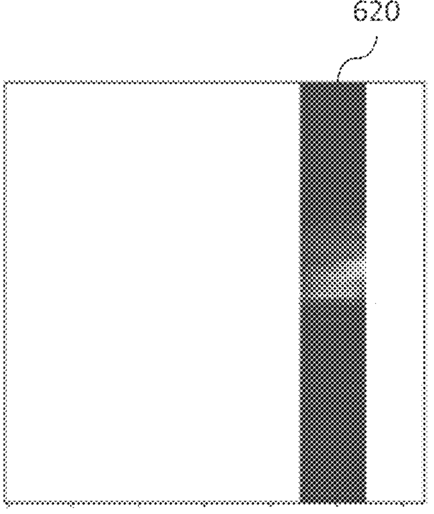

FIG. 6 illustrates example conditioning data. Conditioning data 610 may include a vertical portion of a subsurface representation in the physical space. The conditioning data 610 may define conditioning characteristics as a function of depth. Conditioning data 620 may include a vertical portion of a subsurface representation in the layer space. The conditioning data 620 may define conditioning characteristics as a function of layers. While the conditioning data is shown in FIG. 6 as being two-dimensional, this is merely as an example and is not meant to be limiting. Other dimensions of conditioning data are contemplated.

The generation component 110 may be configured to generate one or more synthetic subsurface representations for a subsurface region. Multiple synthetic subsurface representation that define different subsurface configuration (e.g., different subsurface structures, different subsurface properties) may be generated for the subsurface region. The synthetic subsurface representation(s) may be generated using the trained machine learning model(s). The synthetic subsurface representation(s) for the subsurface region may be generated by the trained machine learning model(s) within the layer space. The synthetic subsurface representation(s) may be generated using the trained machine learning model(s) to match the conditioning characteristic(s) of the subsurface region. A synthetic subsurface representation matching a conditioning characteristic at a location may include the synthetic subsurface representation having the same conditioning characteristic at the location. A synthetic subsurface representation matching a conditioning characteristic at a location may include a characteristic of the synthetic subsurface representation at the location being within a threshold value of the conditioning characteristic. A synthetic subsurface representation that deviates from the conditioning characteristic by less than a threshold amount may considered to be matching the conditioning characteristic.

Generation of a synthetic subsurface representation in within the layer space may result in the synthetic subsurface representation modeling small-scale and continuous features and maintaining physically plausible continuities of subsurface structures/properties, while jointly honoring conditioning characteristic(s). In some implementations, generation of a synthetic subsurface representation for a subsurface region by the trained machine learning model(s) may include generation of subsurface structures (e.g., defined by layer thickness) and subsurface properties (e.g., such as grain size) of the subsurface region. Generation of a synthetic subsurface representation in within the layer space may enable high quality simulation of both subsurface structures and subsurface properties. The simulation of subsurface structures and subsurface properties may be performed concurrently by the trained machine learning model(s).

Figure 7:
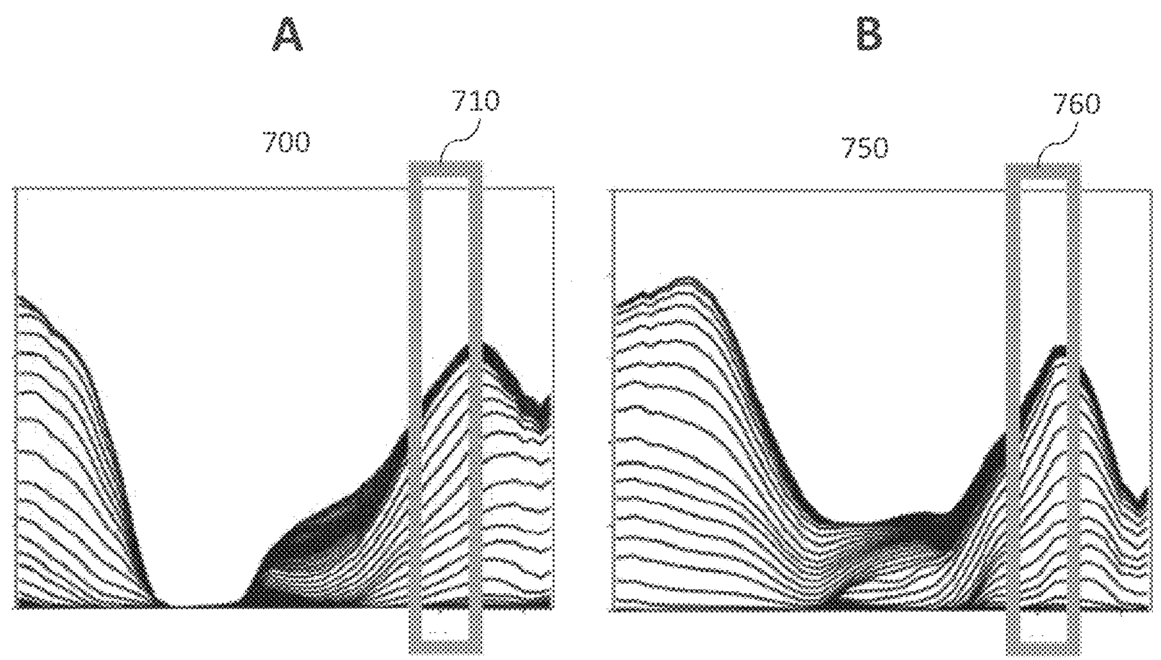
FIG. 7 illustrates example synthetic subsurface representations generated to match conditioning data shown in FIG. 6.
Figure 7:
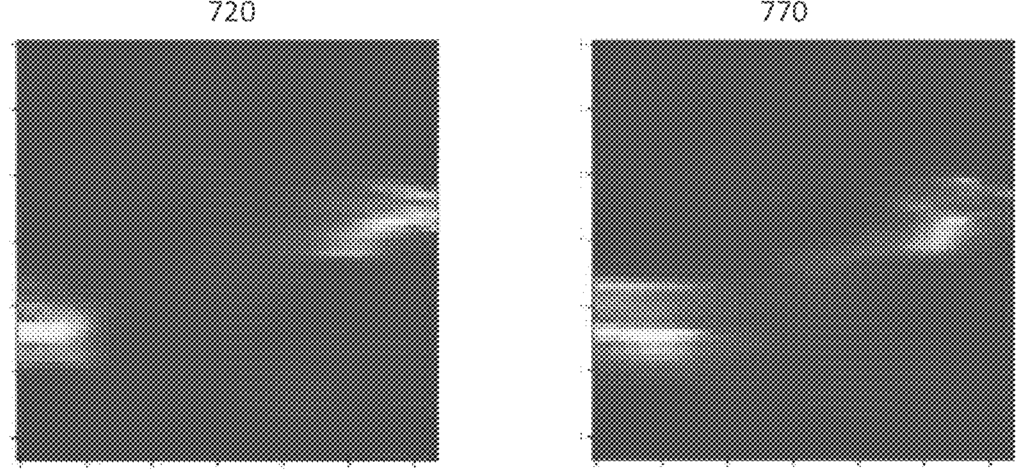

FIG. 7 illustrates example synthetic subsurface representations generated to match conditioning data shown in FIG. 6. Two different synthetic subsurface representations A and B may be generated to match conditioning data shown in FIG. 6. FIG. 7 shows a physical-space view 700 and a layer-space view 720 of the synthetic subsurface representation A, and a physical-space view 750 and a layer-space view 770 of the synthetic subsurface representation B. A vertical portion 710 of the synthetic subsurface representation A may match the conditioning data 610. A vertical portion 760 of the synthetic subsurface representation B may match the conditioning data 610. Similarly, vertical portions of the synthetic subsurface representations A and B in the layer space may match the conditioning data 620.

While the synthetic subsurface representations are shown in FIG. 7 as being two-dimensional, this is merely as an example and is not meant to be limiting. Other dimensions of synthetic subsurface representations are contemplated. While FIG. 7 shows modeling of cell thickness, this is merely as an example and is not meant to be limiting. Multiple subsurface properties, such as cell thickness and grain size may be modeled. Multiple subsurface properties may be modeled simultaneously.

In some implementations, a synthetic subsurface representation within the layer space may be generated by a trained machine learning model based on input of a latent space vector to the trained machine learning model. The latent space vector may include a sequence of numbers. The value of latent space vector may control the how the synthetic subsurface representation is generated by the trained machine learning model. The value of latent space vector may be varied to vary the synthetic subsurface representation generated by the trained machine learning model.

The latent space vector may serve as a low dimensional parameterization of subsurface representation generation. Traditional modeling of subsurface representation may include a high number of parameters, and identifying the right combination of parameter values to generate subsurface representations that match conditioning characteristics may be difficult and costly (e.g., in terms of computing power and/or time). The latent space vector may simplify the variables used to generate subsurface representation while retaining the ability to achieve same variability in the subsurface representations.

In some implementations, the value of the latent space vector input into a trained machine learning may be randomly selected. For example, the initial value of the latent space vector that is used may be randomly selected. In some implementations, the value of the latent space vector input into a trained machine learning may be selected based on values of latent space vectors for other subsurface representation. For example, latent space vector values of other subsurface representation may be analyzed, and these latent space vector values may be used as a guide to select the initial value of the latent space vector. For instance, the latent space vector of a subsurface representation that matches the conditioning characteristic(s) may be used as the initial value of the latent space vector input into the trained machine learning model.

Conditioning of a trained machine learning model may be performed in latent space. Conditioning may be performed in the latent space using one or more optimization techniques. The terms "latent space" and "low-dimensional space" may be used interchangeably in the present disclosure. Conditioning of the trained machine learning model in the latent space may include varying the value of the latent space vector until the synthetic subsurface representation generated by the trained machine learning model matches the conditioning characteristic(s). The value of the latent space vector may be varied by comparing the synthetic subsurface representation to the conditioning characteristic(s). New value of the latent space vector may be determined based on the difference between the last synthetic subsurface representation generated by the trained machine learning model and the conditioning characteristic(s). For example, the difference between the synthetic subsurface representation and the conditioning characteristic(s) may be used to compute a loss/cost function, and a gradient-based solver may be used to vary the value of the latent space vector in a way that minimizes the loss/cost function. Use of other numerical methods to minimize the loss/cost function is contemplated.

In some implementations, determination of whether a synthetic subsurface representation for the subsurface region matches the conditioning characteristic(s) may be performed within the layer space. For example, the portion(s) of the synthetic subsurface representation for the subsurface region in the layer space that correspond to the location of the conditioning characteristic(s) may be compared with the conditioning characteristic(s) in the layer space to determine whether the portion(s) of the synthetic subsurface representation match the conditioning characteristic(s) (e.g., have the same value of thickness and/or subsurface properties as the conditioning characteristic(s); are within threshold value of the thickness and/or subsurface properties of the conditioning characteristic(s)).

In some implementations, determination of whether a synthetic subsurface representation for the subsurface region matches the conditioning characteristic(s) may be performed within the physical space. For example, a synthetic subsurface representation output by the trained machine learning model may be converted from the layer pace to the physical space, and the portion(s) of the synthetic subsurface representation for the subsurface region in the physical space that correspond to the location of the conditioning characteristic(s) may be compared with the conditioning characteristic(s) in the physical space to determine whether the portion(s) of the synthetic subsurface representation match the conditioning characteristic(s).

In some implementations, a synthetic subsurface representation generated by the trained machine learning model may cover an entire subsurface region. For example, a synthetic subsurface representation generated by the trained machine learning model may cover an entire reservoir.

In some implementations, a synthetic subsurface representation generated by the trained machine learning model may cover a portion of a subsurface region. For example, a synthetic subsurface representation generated by the trained machine learning model may cover a portion of a reservoir. Separate synthetic subsurface representations may be generated for separate portions of the subsurface region, and the separate synthetic subsurface representations may be combined to generate a synthetic subsurface representation for the subsurface region. For example, individual synthetic subsurface representations generated by the trained machine learning model may be used as a tile (e.g., two-dimensional tile, three dimensional tile) to fill a simulation domain, and the simulation domain may be filled to generate the synthetic subsurface representation for the subsurface region.

Figure 8:
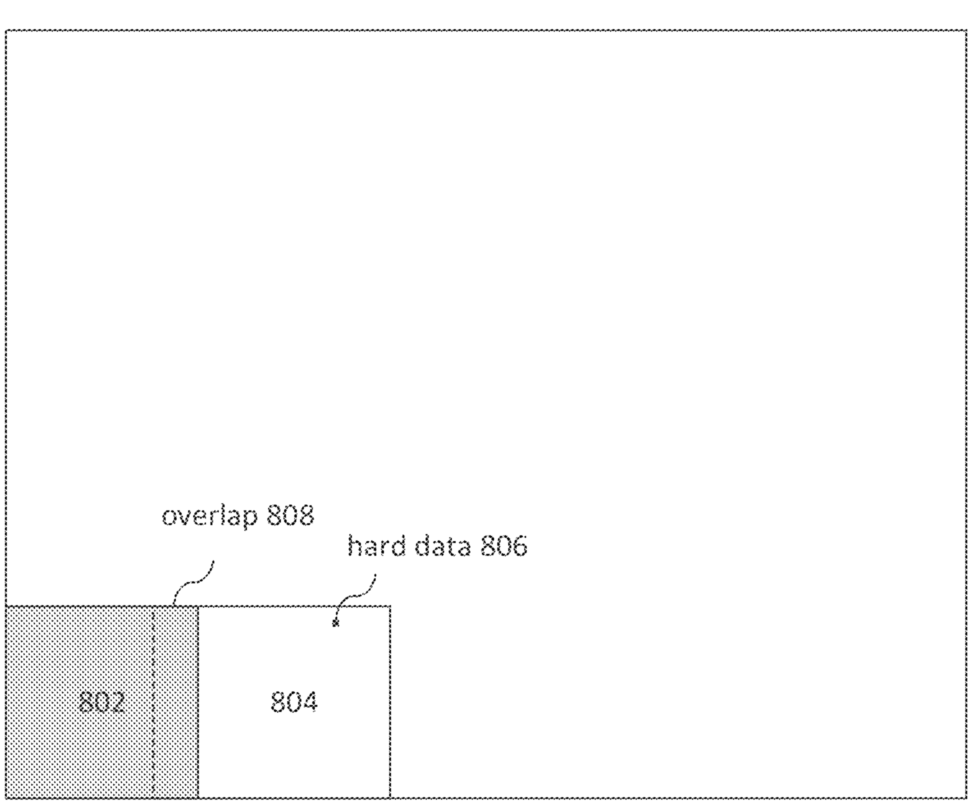
FIG. 8 illustrates example generation of synthetic subsurface representation tiles to fill a simulation domain.

FIG. 8 illustrates example generation of synthetic subsurface representation tiles to fill a simulation domain 800. A tile 802 may have been placed in the simulation domain 800. A new tile 804 may need to be inserted in the simulation domain 800. A synthetic subsurface representation may be generated as described herein to be used as the tile 804. For example, the 804 may need to match hard data 806 at a location shown in FIG. 8. A synthetic subsurface representation that matches the hard data 806 may be generated by a trained machine learning model by performing conditioning in the latent space. Soft data may be used to guide generation of the synthetic subsurface representation. Conditioning may be performed so match the synthetic subsurface representation with subsurface characteristics inside an overlap 808 with the tile 802. In some implementations, blending may be performed to ease the transition between adjacent tiles.

While the tiles are shown in FIG. 8 as being two-dimensional, this is merely as an example and is not meant to be limiting. Other dimensions of tiles are contemplated. While only a single overlap between two adjacent tiles are shown in FIG. 8, this is merely as an example and is not meant to be limiting. Other number and placement of overlap between adjacent tiles are contemplated.

In some implementations, generation of tiles with hard data may be prioritized over generation of tiles without hard data. After the tiles with hard data are generated and placed in the simulation domain, tiles adjacent to already-filled tiles may be generated and paced in the simulation domain.

In some implementations, all tiles may be generated by the trained machine learning model(s). Individual tiles for insertion into the simulation domain may be generated by the trained machine learning model(s) as described herein.

In some implementations some of the tiles may be generated by the trained machine learning model(s). For example, some tiles for insertion into the simulation domain may be generated by the trained machine learning model(s) as described herein, while other tiles for insertion may be extracted from existing subsurface representations.

In some implementations, tiles for insertion into the simulation domain may be generated by the trained machine learning model(s) as described herein based on existing subsurface representations not sufficiently matching the conditioning characteristics (e.g., hard data, overlap) in the simulation domain. For example, existing subsurface representations may be searched to find portions that matches the conditioning characteristics of a tile. Based on the existing subsurface representation not having any portions that match the conditioning characteristics (e.g., deviating from the conditioning characteristics by more than a threshold amount), the trained machine learning model may be used to generate a synthetic subsurface representation for use as the tile. Other combinations of subsurface representations and synthetic subsurface representations to fill the simulation domain are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2B:
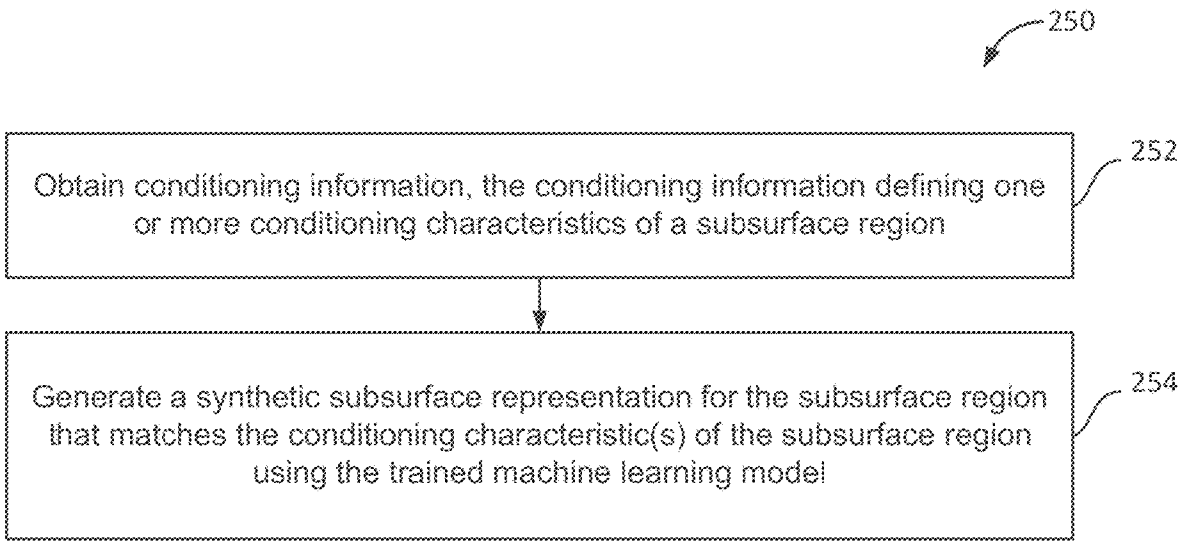
FIG. 2B illustrates an example method for generating synthetic subsurface representations.

FIGS. 2A and 2B illustrate methods 200, 250 for generating synthetic subsurface representations. The operations of methods 200, 250 presented below are intended to be illustrative. In some implementations, methods 200, 250 may be accomplished with one or more additional operations not described, and/or without one or more of the operations discussed. In some implementations, two or more of the operations may occur substantially simultaneously.

In some implementations, methods 200, 250 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2A and method 200, at operation 202, subsurface representation information may be obtained. The subsurface representation information may define a set of subsurface representations. The set of subsurface representations may define subsurface configurations in layer space such that the subsurface configurations are defined as a function of layers. In some implementation, operation 202 may be performed by a processor component the same as or similar to the subsurface representation information component 102 (Shown in FIG. 1 and described herein).

At operation 204, a machine learning model may be trained using the set of subsurface representations within the layer space. The trained machine learning model may generate the synthetic subsurface representations in the layer space. In some implementation, operation 204 may be performed by a processor component the same as or similar to the train component 104 (Shown in FIG. 1 and described herein).

At operation 206, the trained machine learning model may be stored in a storage medium. In some implementation, operation 206 may be performed by a processor component the same as or similar to the storage component 106 (Shown in FIG. 1 and described herein).

Referring to FIG. 2B and method 250, conditioning information may be obtained. The conditioning information may define one or more conditioning characteristics of a subsurface region. In some implementation, operation 252 may be performed by a processor component the same as or similar to the conditioning information component 108 (Shown in FIG. 1 and described herein).

At operation 254, a synthetic subsurface representation for the subsurface region that matches the one or more conditioning characteristics of the subsurface region may be generated using the trained machine learning model. In some implementation, operation 254 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating synthetic subsurface representations, the system comprising:

one or more physical processors configured by machine-readable instructions to:

obtain subsurface representation information, the subsurface representation information defining a set of subsurface representations, the set of subsurface representations defining subsurface configurations in layer space such that the subsurface configurations are defined as a function of layers, wherein vertical dimension in the layer space is layers rather than physical distance, wherein a given subsurface representation for a given subsurface region with multiple physical layers of different thicknesses represent the multiple physical layers of different thicknesses with uniform layers in the layer space;

train a machine learning model using the set of subsurface representations within the layer space, wherein the trained machine learning model generates the synthetic subsurface representations in the layer space; and store the trained machine learning model in a storage medium.

2. The system of claim 1, the one or more physical processors are further configured by the machine-readable instructions to:

obtain conditioning information, the conditioning information defining one or more conditioning characteristics of a target subsurface region; and generate a first synthetic subsurface representation for the target subsurface region that matches the one or more conditioning characteristics of the target subsurface region using the trained machine learning model, wherein the first synthetic subsurface representation comprises multiple uniform layers in the layer space that represent multiple physical layers of different thicknesses in the target subsurface region.

3. The system of claim 2, wherein:

the one or more conditioning characteristics are defined in physical space such that the one or more conditioning characteristics are defined as a function of depth;

the one or more conditioning characteristics are converted from the physical space to the layer space such that the one or more conditioning characteristics are defined as the function of layers;

the first synthetic subsurface representation for the target subsurface region is generated by the trained machine learning model within the layer space; and determination of whether the first synthetic subsurface representation for the target subsurface region matches the one or more conditioning characteristics is performed within the layer space.

4. The system of claim 2, wherein:

the one or more conditioning characteristics are defined in physical space such that the one or more conditioning characteristics are defined as a function of depth;

the first synthetic subsurface representation for the target subsurface region is generated by the trained machine learning model within the layer space;

the first synthetic subsurface representation is converted from the layer space to the physical space;

determination of whether the first synthetic subsurface representation for the target subsurface region matches the one or more conditioning characteristics is performed within the physical space.

5. The system of claim 2, wherein the first synthetic subsurface representation within the layer space is generated by the trained machine learning model based on input of a latent space vector to the trained machine learning model, wherein conditioning of the trained machine learning model is performed in latent space, the latent space different from the layer space.

6. The system of claim 2, wherein generation of the first synthetic subsurface representation by the trained machine learning model includes generation of subsurface structures and subsurface properties of the target subsurface region.

7. The system of claim 6, wherein the subsurface structures of the target subsurface region are defined by layer thickness and the subsurface properties of the target subsurface region are defined by grain size.

8. The system of claim 1, wherein training of the machine learning model using a subsurface representation within the layer space includes use of a moving window to extract portions of the subsurface representation within the layer space for use in training the machine learning model.

9. The system of claim 8, where subsurface structures and subsurface properties from the extracted portions of the subsurface representation within the layer space are used to train the machine learning model.

10. The system of claim 1, wherein the machine learning model includes a generative neural network.

11. A method for generating synthetic subsurface representations, the method comprising:

obtaining subsurface representation information, the subsurface representation information defining a set of subsurface representations, the set of subsurface representations defining subsurface configurations in layer space such that the subsurface configurations are defined as a function of layers, wherein vertical dimension in the layer space is layers rather than physical distance, wherein a given subsurface representation for a given subsurface region with multiple physical layers of different thicknesses represent the multiple physical layers of different thicknesses with uniform layers in the layer space;

training a machine learning model using the set of subsurface representations within the layer space, wherein the trained machine learning model generates the synthetic subsurface representations in the layer space; and storing the trained machine learning model in a storage medium.

12. The method of claim 11, further comprising:

obtaining conditioning information, the conditioning information defining one or more conditioning characteristics of a target subsurface region; and generating a first synthetic subsurface representation for the target subsurface region that matches the one or more conditioning characteristics of the target subsurface region using the trained machine learning model, wherein the first synthetic subsurface representation comprises multiple uniform layers in the layer space that represent multiple physical layers of different thicknesses in the target subsurface region.

13. The method of claim 12, wherein:

the one or more conditioning characteristics are defined in physical space such that the one or more conditioning characteristics are defined as a function of depth;

the one or more conditioning characteristics are converted from the physical space to the layer space such that the one or more conditioning characteristics are defined as the function of layers;

the first synthetic subsurface representation for the target subsurface region is generated by the trained machine learning model within the layer space; and determination of whether the first synthetic subsurface representation for the target subsurface region matches the one or more conditioning characteristics is performed within the layer space.

14. The method of claim 12, wherein:

the one or more conditioning characteristics are defined in physical space such that the one or more conditioning characteristics are defined as a function of depth;

the first synthetic subsurface representation for the target subsurface region is generated by the trained machine learning model within the layer space;

the first synthetic subsurface representation is converted from the layer space to the physical space;

determination of whether the first synthetic subsurface representation for the target subsurface region matches the one or more conditioning characteristics is performed within the physical space.

15. The method of claim 12, wherein the first synthetic subsurface representation within the layer space is generated by the trained machine learning model based on input of a latent space vector to the trained machine learning model, wherein conditioning of the trained machine learning model is performed in latent space, the latent space different from the layer space.

16. The method of claim 12, wherein generation of the first synthetic subsurface representation by the trained machine learning model includes generation of subsurface structures and subsurface properties of the target subsurface region.

17. The method of claim 16, wherein the subsurface structures of the target subsurface region are defined by layer thickness and the subsurface properties of the target subsurface region are defined by grain size.

18. The method of claim 11, wherein training of the machine learning model using a subsurface representation within the layer space includes use of a moving window to extract portions of the subsurface representation within the layer space for use in training the machine learning model.

19. The method of claim 18, where subsurface structures and subsurface properties from the extracted portions of the subsurface representation within the layer space are used to train the machine learning model.

20. The method of claim 11, wherein the machine learning model includes a generative neural network.

* * * * *